United States Patent [19]
Cronheim

[11] 3,711,945
[45] Jan. 23, 1973

[54] PIE CUTTER AND SERVER

[76] Inventor: Richard B. Cronheim, 7 Upper Barnes, St. Louis County, Mo. 63124

[22] Filed: May 12, 1971

[21] Appl. No.: 142,679

[52] U.S. Cl.....................................................30/142
[51] Int. Cl. ..............................................B26b 11/00
[58] Field of Search........30/114, 123, 124, 136, 142, 30/319, 365

[56] References Cited

UNITED STATES PATENTS 3,174,223   3/1965   Gerson.....................................30/142

FOREIGN PATENTS OR APPLICATIONS 627,947   8/1949   Great Britain..........................30/114

*Primary Examiner*—Othell M. Simpson
*Attorney*—Ralph W. Kalish

[57] ABSTRACT

A household utensil for cutting and serving pies, cakes, and the like comprising a handle, generally wedge-shaped serving blade secured to said handle, and a rotary cutter mounted upon an arm which is pivoted upon said handle. Means for rocking said arm downwardly to cause said cutter to extend through an opening in said blade for operative purposes, and resilient means urging said arm into upward inoperative position.

9 Claims, 6 Drawing Figures

PATENTED JAN 23 1973

INVENTOR
RICHARD B. CRONHEIM
BY Ralph W. Kalish
ATTORNEY

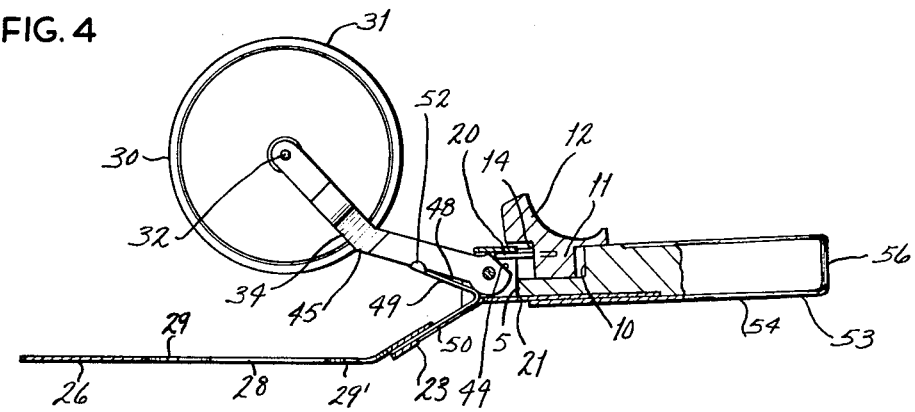
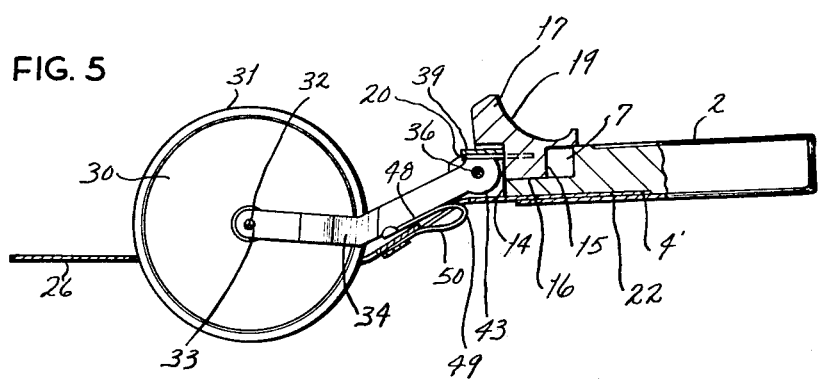
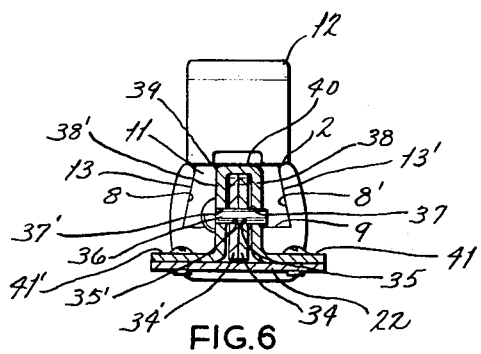
INVENTOR
RICHARD B. CRONHEIM

PIE CUTTER AND SERVER

BACKGROUND AND SUMMARY OF THE INVENTION

This invention relates in general to household utensils and, more particularly, to a unitary pie cutter and server. Heretofore, separate utensils have been required for effecting the cutting and serving of sections, such as wedges of pies, cakes, pastry, pizza and the like. By the present invention a single instrument is provided which embodies means for effecting the sequential acts of cutting and serving and thereby obviating the customary resort to manipulation of separate devices.

Therefore, it is an object of the present invention to provide a pie cutter and server which is especially adapted for effecting the cutting and serving operations with respect to pies and the like in a simple, facile manner, requiring no developed skill on the part of the user and, thus, being intended for general household utilization.

It is another object of the present invention to provide a utensil of the type stated which incorporates a cutter normally biased into inoperative position and being movable into operative position by means easily manipulated by the user and whereby upon release of such means the cutter is automatically returnable to inoperative position.

It is a still further object of the present invention to provide a device of the character stated which is amenable to ease of cleaning; and is compact in construction, with the parts thereof being simple and, hence, durable.

It is another object of the present invention to provide a utensil of the type stated which is reliable in operation; which is economical in manufacture; and which is resistant to breakdown in operation.

BRIEF DESCRIPTION OF THE DRAWINGS

FIG. 4 is a vertical transverse sectional view taken on the line 4—4 of FIG. 2.

FIG. 5 is a vertical transverse sectional view taken substantially on the line 4—4 of FIG. 2 illustrating the pie cutter and server in cutting position.

FIG. 6 is a vertical transverse sectional view taken on the line 6—6 of FIG. 1.

DESCRIPTION OF THE PREFERRED EMBODIMENT

Figure 1:
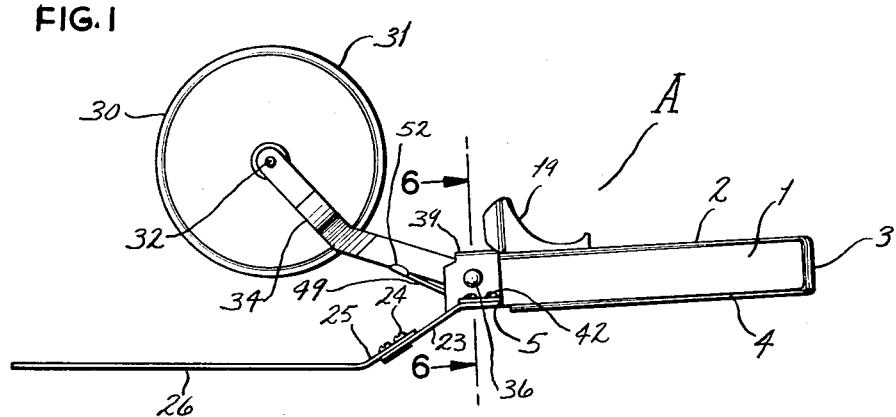
FIG. 1 is a side elevational view of a pie cutter and server constructed in accordance with and embodying the present invention, with the cutter in inoperative position.

Referring now by reference characters to the drawings which illustrate the preferred embodiment of the present invention, A generally designates a pie cutter and server comprising a handle 1 fabricated of any suitable, rigid material, such as wood, plastic, or the like, and being quadrilateral in cross section having a top surface 2, a rearward end surface 3, a bottom surface 4, front end surface 5, and side surfaces 6,6'. Formed in the forward end of handle 1 is a recess 7 which opens upwardly through top surface 2 and forwardly through front end surface 5 in the upper portion of the latter. Said recess 7 is defined by a pair of side walls 8,8' which converge upwardly toward top surface 2, a base 9 and a rearward end wall 10. Slideably disposed within recess 7 for movement longitudinally thereof is the slide block 11 of a control element 12. Said slide block 11 is provided with side walls 13,13' which are complementary to the adjacent recess side walls 8,8' for general dove-tail engagement therewith; said block having parallel front and rear end surfaces 14,15, respectively, and a bottom surface 16 for disposition upon recess base 9.

With reference to FIGS. 4 and 5, it will be seen that the length of slide block 11 is less than the longitudinal extent of recess 7.

Upwardly of slide block 11, control element 12 incorporates a superstructure 17 which extends forwardly and rearwardly of block 11 with its undersurfaces being planarwise parallel to, and immediately above, handle top surface 2 so that the upper portion of element 12 may be easily movable thereover. As may best be seen in FIG. 6, superstructure 17 of element 12 extends laterally beyond the immediately adjacent sides of block 11 thereby preventing any inadvertent displacement of control element 12 upwardly of recess 7. Superstructure 17 of control element 12 is contoured to present an arcuate, thumb-receiving surface 19 so that the user may effect reciprocal sliding movement of element 12 by application of thumb pressure against said surface 19.

Fixed in the central upper portion of front end surface 14 of slide block 11, and projecting forwardly therefrom, is a rigid, elongated pin-like finger 20 for purposes presently appearing.

The forward portion of under surface 4 of handle 1 is provided with a shallow recess 4' for receiving the relatively narrow shank 21 of a mounting member 22 incorporating, at the forward end of shank 21, spacedly beyond handle end surface 5, a flared flange 23 being angularly related to the plane of shank 21 so as to extend forwardly and downwardly thereof when handle 1 is in normal operative disposition. Flange 23 is secured, as by rivets, and the like, 24, to the connecting skirt 25 provided at the rearward widened end of a generally triangular or wedge-shaped serving blade 26 which thus converges to an apex, as at 27, at its forward end and being of such surface extent as to accommodate the usual wedge-cut, constituting a normal serving of pie, pastry, or the like.

The longitudinal axis of serving blade 26 is substantially axially parallel with that of handle 1.

Formed within blade 26 is an elongated slot-like opening 28 which progresses from a point slightly forwardly of the transverse axis of said blade 26 to a point immediately adjacent skirt 25. For purposes to be discussed hereinbelow, the forward and rearward end portions of said opening 28 are of relatively increased extent and of diamond shape or contour, as at 29,29'. Aperture 28 is dimensioned for receiving a rotary cutter 30 having about its periphery a continuous knife edge 31. Cutter 30 is adapted for rotation by disposition upon a shaft-forming pin 32 fixed at its end within openings 33 provided in the forward end portions of a pair of opposed, parallel arms 34,34'. Said arms 34,34' extend rearwardly toward the forward end of handle 1 and adjacent their rearward extremities are suitably apertured as at 35,35', respectively, for journaling therethrough of a shaft-forming pin 36, which at its ends extends through aligned openings 37,37' in the side walls 38,38', respectively, of a retainer or housing 39; said latter including a top wall 40 integral with said side walls 38,38' and disposed spacedly above the adjacent portions of arms 34,34'. At their lower ends side walls 38,38' are respectively continuous with outturned relatively wide flanges 41,41' which rest upon, and are secured to, the underlying portion of mounting member 22; said securement being as by screws 42. The rearward end portions of each arm 34,34' are of substantial annular contour, as at 43, but having a flattened peripheral cam surface 44 which is so presented as to be normally confronting top wall 40 of retainer 39. Said pin-like finger 20 is thus presented for extension into the spacing between top wall 40 of retainer 39 and the upper cam portion 44 of said arms 34,34' (see FIG. 4).

It will thus be seen that cutter 30 by means of arms 34,34' is adapted to be swung toward and away from serving blade 26 by means of the pivot axis established by pin 36. Arms 34,34' substantially intermediate their length are each angulated, as at 45, so that upon downward swinging of the same, cutter 30 will extend through blade opening 28 to present a substantial portion of its cutting edge 31 for operative purposes; in which position the rearward portion of arms 34,34' will clear skirt 25.

Figure 2:
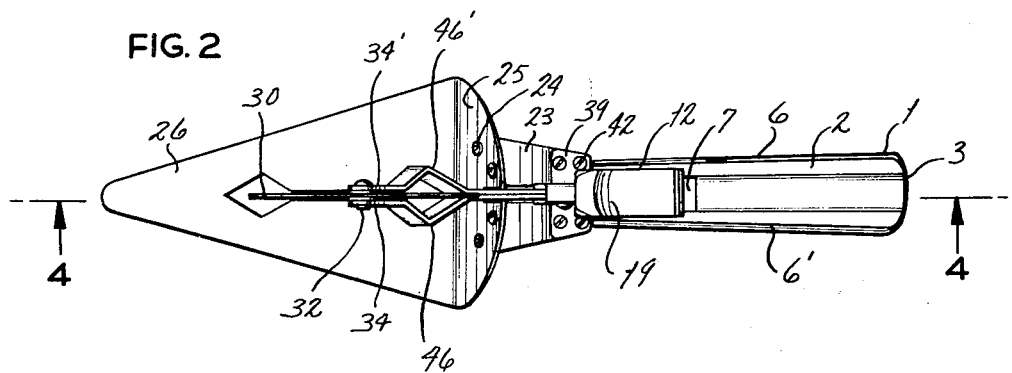
FIG. 2 is a top plan view.
Figure 3:
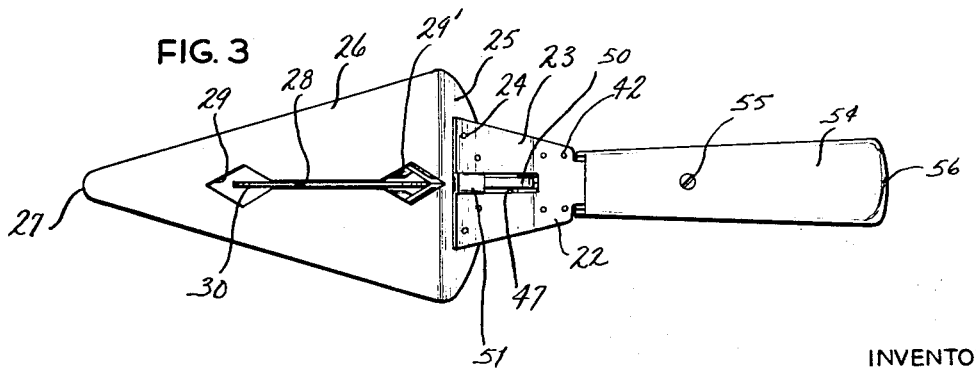
FIG. 3 is a bottom view.

As may be seen in FIG. 2, arms 34,34' between pin 32 and a point slightly rearwardly of angulation 45, diverge from each other and then returningly converge to develope V-shaped reinforcing ribs 46,46'.

Projecting through an opening 47 located centrally of flared flange 23 of mounting member 22 is the upper leg 48 of a generally U-shaped leaf spring 49 having a lower leg 50 suitably anchored at its normally free end to flared flange 23, as at 51. Said upper leg 48 is engaged to the adjacent undersurfaces of arms 34,34' by a clip-like element 52. Thus, leaf spring legs 48,50 are urged through their normal bias to separate or move away from each other so that upper leg 48 will bias cutter mounting arms 34,34' into upward, inoperative position, as may best be seen in FIG. 4.

As may best be seen in FIGS. 1 and 4, with control element 12 disposed in the rearward portion of recess 7, arms 34,34', by means of spring 49, will be biased into upwardly swung position thereby disposing cutter 30 elevatedly above blade 26. It is to be particularly observed that arms 34,34' are so contoured, and cooperate with associate structure, as to develop a spacing between cutter 30 and blade 26 adequate to accommodate the customary height of a piece of pie or cake, such as, particularly, pizza pie, so that blade 26 may serve same without danger of damaging contact by cutter 30.

With special reference being made to FIG. 4, it will be seen that the upward swing of arms 34,34', under influence of spring 49, is limited by abutment of the normally outer portion of cam surface 44 against the inner face of top wall 40. It is, of course, apparent that such engagement could be effected by a projection, if desired, formed at the forward end of cam 44 so as to determine the arc of rotation about pin 36. Pin-like finger 20 projecting from control element 12 is thus positioned to abut cam surface 44 in its forward upper portion when arms 34,34' are in upwardly swung condition (FIG. 4).

When it is desired to utilize cutter 30, the user, by applying the thumb to surface 19, will push control element 12 toward the forward end of recess 7 causing pin 20 to operate against cam surface 44, overcoming the bias of spring 49 and thus effect a downward rocking of arms 34,34'. As finger 20 progresses, it will operate against cam surface 44 forcing arms 34,34' downwardly with cutter blade 30 moving in its lower portion through blade opening 28 into the position shown in FIG. 5. Thus, pin 20 will be interposed between cam surface 44 and top wall 40 to constitute a barrier against accidental spring-influenced return rotation. The bias of spring 49 will also maintain pin 20 in tightly sandwiched condition, proof against premature displacement. Thus, by reason of such interrelationship, cutter 30 is stabilized in operative condition. Since cutter 30 is freely rotatable about pin 32, the user by appropriate manipulation of handle 1 may cause cutter 30 to sever a section from the cake, pie, or other pastry, being cut. The relative dimension of cutter 30 and blade 26, as well as the extent of projection of the latter through aperture 28, is understandably dictated by the particular size and type of pie being cut so that during the cutting action blade 26 will not inadvertently interfere.

Cutter 30 will remain in operative position until the user pulls rearwardly, as by thumb pressure, upon control element 12 so as to withdraw pin 20 from engagement between cam surface 44 and wall 40 and thereby free arms 34,34' for return upward swinging under bias of spring 49.

In order to finished the construction of device A, there may be provided reinforcing plate 53 having a bottom section 54 disposed against bottom surface 4 of handle 1 and overlying shank 21 of mounting member 22; the same being held, as by a screw 55. At its end remote from mounting member 22 plate 53 incorporates a flange-like portion 56 for snug disposition against the adjacent end surface of handle 1.

Having described my invention, what I claim and desire to obtain by Letters Patent is:

1. A pie cutter and server comprising a handle, a serving blade, means securing said serving blade to said handle, a cutter, cutter support means rotatably mounting said cutter, said cutter support means being swingably mounted on said handle for movement between upper, cutter inoperative condition and lower, cutter operative condition, and cutter disposition control means slideably disposed on said handle for movement toward and away from said cutter support means causing same to be rocked between cutter operative and cutter inoperative condition.

2. A pie cutter and server comprising a handle, a serving blade, means securing said serving blade to said handle, an annular cutter, means pivotally mounted on said handle for rotatably supporting said cutter, control means for rocking said cutter support means to dispose said cutter for operative condition, said serving blade having an opening, said cutter extending through said serving blade opening when in operative condition.

3. A pie cutter and server as defined in claim 11 and further characterized by means normally urging said cutter support means for disposing said cutter in inoperative condition.

4. A pie cutter and server as defined in claim 11 and further characterized by said cutter support means comprising a pair of arms, a shaft extending between said arms in their outer end portions for rotatably supporting said cutter, means pivotally mounting said arms at their inner ends immediately adjacent the forward end of said handle.

5. A pie cutter and server as defined in claim 4 and further characterized by said serving blade being located spacedly downwardly of said means mounting said arms at their inner ends, resilient means urging said arms into upwardly swung position.

6. A pie cutter and server as defined in claim 4 and further characterized by said arms being so positioned as to normally present said cutter above said serving blade, said serving blade having an opening aligned with said cutter so that upon downward swinging of said arms through operation of said control means, said cutter will extend through said opening.

7. A pie cutter and server as defined in claim 6 and further characterized by said arms at their inner ends having a cam surface, a cam follower pin provided with said control means for engaging said cam surface whereby upon operation of said control means said cam following means will cause said arms to be swung downwardly.

8. A pie cutter and server as defined in claim 7 and further characterized by an abutment member provided proximate the forward end of said handle for engaging said cam follower when said arms are downwardly swung for inhibiting unauthorized, premature return swinging of said arms.

9. A pie cutter and server as defined in claim 5 and further characterized by said resilient means comprising a leaf spring.

* * * * *